July 27, 1926.
R. SALIN, NÉE LEVÝ
1,594,272
FASTENING DEVICE FOR DOORS OF MOTOR VEHICLES
Filed June 12, 1922   3 Sheets-Sheet 1
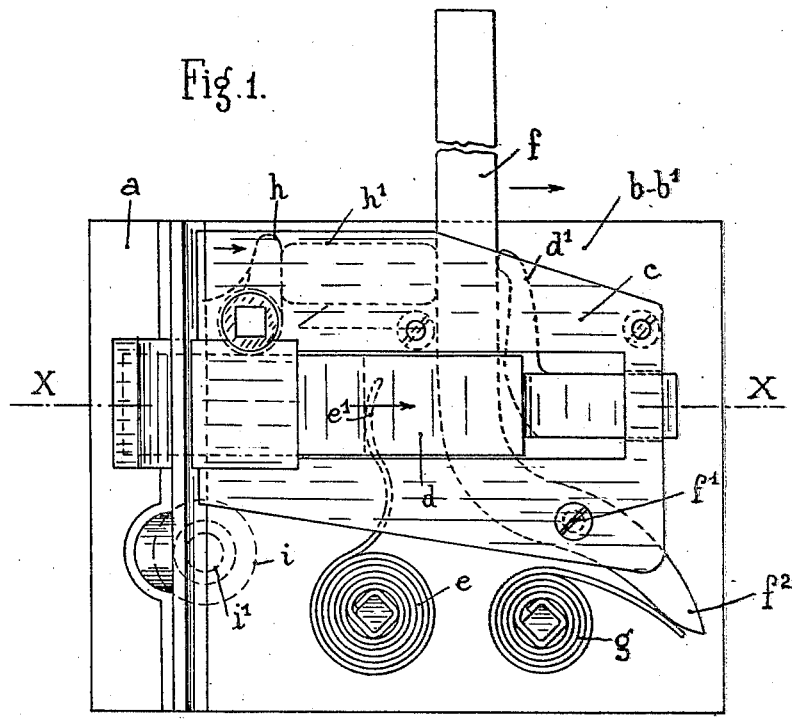
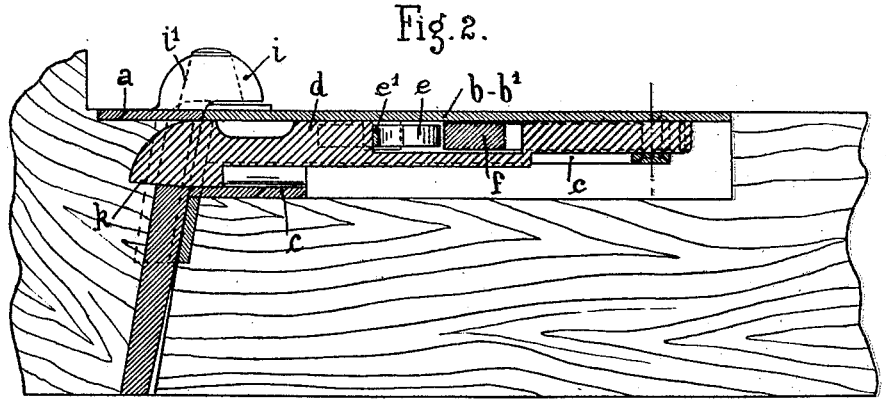

July 27, 1926.

R. SALIN, NÉE LEVY 1,594,272

FASTENING DEVICE FOR DOORS OF MOTOR VEHICLES

Filed June 12, 1922     3 Sheets-Sheet 2

Inventor,
Rachel Salin, née Levy
By Henry Orth Jr. atty

July 27, 1926.

R. SALIN, NÉE LEVÝ

1,594,272

FASTENING DEVICE FOR DOORS OF MOTOR VEHICLES

Filed June 12, 1922   3 Sheets-Sheet 3

Patented July 27, 1926.

1,594,272

UNITED STATES PATENT OFFICE.

RACHEL SALIN, NÉE LÉVY, OF PARIS, FRANCE.

FASTENING DEVICE FOR DOORS OF MOTOR VEHICLES.

Application filed June 12, 1922, Serial No. 567,829, and in France August 3, 1921.

This invention relates to a fastening device for doors or motor vehicles whereof one particular feature consists in the fact that the surface of the door latch bearing against the staple when the door is closed is not parallel to the plane of the door as in known fastening devices, but is inclined or bevelled and engages a ramp on the staple which has a corresponding inclination, so that the thrust of the spring which tends to drive the latch into the staple will set up a reaction having a component which is perpendicular to the door, thereby providing for the complete closing of the door and the tight holding of the closing device in an automatic manner, irrespectively of the wear of the parts.

Another particular feature of the invention results from the combination of the fastening device with the door holding device according to the United States Patent No. 1,441,530, dated January 9, 1923.

The following description, together with the accompanying drawings which are given by way of example, sets forth an embodiment of the invention.

Fig. 1 is a front view of the interior of the fastening device in the closed position.

Fig. 2 is a section on the line X—X Fig. 1.

Figure 3:
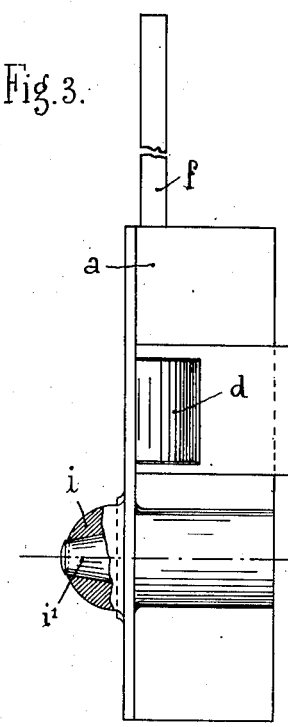
Fig. 3 is a side view of the fastening device in the closed position.
Figure 4:
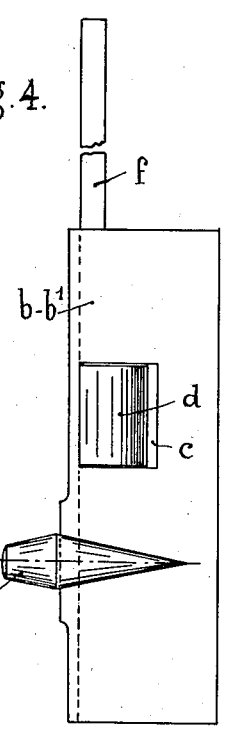
Fig. 4 is a side view of the portion of said device carrying the door latch and disposed upon the door leaf.
Figure 5:
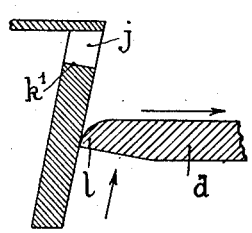
Figure 6:
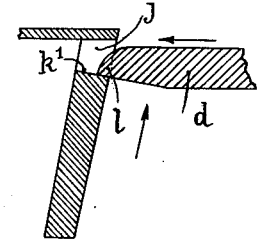
Figure 7:
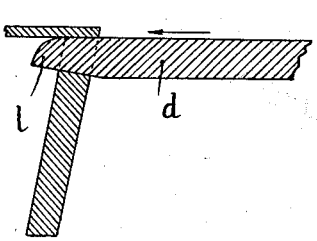

Figs. 5, 6 and 7 are three diagrammatic views explaining the operation of the inclined plane of the latch.

Figure 8:
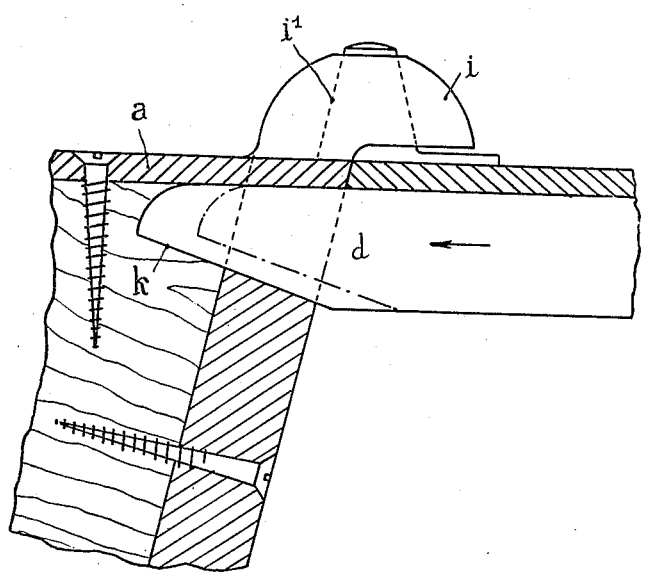

Fig. 8 is a diagrammatic view showing the operation of the latch in case of wear.

In the form of construction indicated in said figures, the fastening device is composed in the known manner of two parts, the portion $a$ comprising the staple which is cast in one piece and is mounted on the door frame, and the second portion $b$ secured to the door leaf and comprising the latch and the operating devices for the same. The portion $b$ is constituted by a plate $b^1$ bent at a right angle and is screwed to the door leaf. It has disposed upon the internal surface, on the inner side of the door leaf, the frame $c$ wherein is slidable the latch $d$. A spiral spring $e$ has one end secured to the portion $b$ and bears at the other end $e^1$ upon a projection $d$ of the latch whereby the latter shall be constantly impelled towards the exterior into the position corresponding to the door closing. A lever $f$ pivoted at $f^1$ to the plate $b$ is caused to act upon the projection $d^1$ of the latch in order to slide the latch within the frame, said lever being terminated by a knob of any suitable kind which is disposed in the known manner on the upper rim of the door.

The cam $h$ is provided with a knob disposed at the exterior and at the same height as the fastening device, and it acts upon the lever $f$ through the medium of a sliding member $h^1$, Fig. 1, disposed between the plate $b^1$ and the frame $c$ of the latch, and the door can thus be opened or closed by means of the knob disposed upon the cam $h$. A spiral spring $g$ is secured at one end to a stud on the plate $b^1$ and acts at the other end upon the nib $f^2$ of the lever $f$ in such manner that when the door is closed the said lever will be caused to bear upon the sliding member $h^1$, and this will obviate all rattling of the lever $f$ and of the cam $h$ which would result from the jarring movements.

The portion $a$ secured to the door frame is formed in a single piece wherein is pressed the staple and the female portion or mortise $i$ of the door holding device. When the door is closed, the conical male portion $i^1$ which is cast integral with the plate $b$ will engage the said mortise. The conical male portion $i^1$ and the mortise $i$ constitute the device set forth in applicant's United States Patent No. 1,441,530, dated January 9, 1923.

The particular feature of the present invention consists in the fact that the surface $k$, Fig. 2, of the door latch is not parallel to the plane of the door but is somewhat inclined to the latter, as observed in Fig. 2 and Figs. 5 to 7, and the same is true for the surface $k^1$ of the staple $j$, Fig. 2. It will follow that upon closing the door, that is, on passing from the position Fig. 5 to the position Fig. 7, the end $l$ of the nib of the latch 1( $d$ will engage the inclined plane $k^1$, Fig. 6, somewhat before the door is entirely closed. At this moment, the spring $e$ which impels the latch into the staple will exert a force upon the inclined plane whereof the reaction 10 comprises a component perpendicular to the plane of the door, and this will tend to bring the door into the closed position as well as to hold the conical member $i^1$ tightly within the mortise $i$ of the door holding device. By 110 the said arrangement, the door will be closed and held tight in an automatic manner.

Furthermore, after being in use for some time, the surface $k^1$ of the staple will become more or less worn. But an increased wear of the staple $j$ will permit the latch to be inserted to a correspondingly greater degree, and as by reason of the inclination of the surface $k$ the end $l$ of the latch will have a beveled form, the more the latch is driven in, the greater will be the thickness of the portion engaging the staple $j$, so that the wear is automatically taken up and the male conical portion $i^1$ will remain tightly held within the aperture or female cone $i$. This arrangement is shown in Fig. 8, wherein the position of the latch before the wear of the staple is indicated by the broken lines, and after the wear by the full lines.

Another advantage of said arrangement consists in the fact that when the door is pushed in order to close the same, it will no longer rebound without giving time for the latch to enter the staple, as is the case with the known door devices, but will now close in a more reliable manner inasmuch as the latch can be inserted into the staple with the greatest facility.

It is obvious that the said device is susceptible of all desired modifications in detail without departing from the principle of the invention.

What I claim is:

A fastening for motor vehicle doors comprising a metallic member to be fixed to the internal face of the door and having a conical stud formed integral therewith whose axis is perpendicular to said face, a metallic staple to be secured to the internal face of the door frame and having a conical aperture to receive and be engaged by the stud when the door is closed, a latch bolt slidably mounted in the metallic member and having its latching end beveled on its inner face, means on said metallic member for operating said bolt, said staple having a bolt receiving recess provided with an inclined inner face corresponding with the beveled end of the bolt, said operating means including a spring for projecting the latching end of the bolt into the recess and maintaining the beveled inner face of the bolt in constant contact with the inclined face of said recess, whereby the conical engaging surfaces of the aperture and stud are maintained in constant contact by the latch irrespective of the amount of wear of the latch and stud, and movement of the door in approximately rectangular directions when closed is prevented.

In testimony that I claim the foregoing as my invention, I have signed my name hereto.

RACHEL SALIN, née LÉVY.